July 7, 1964 M. W. HUBER 3,140,082
HYDRAULIC SYSTEM

Filed June 25, 1962 2 Sheets-Sheet 2

INVENTOR
MATTHEW W. HUBER

BY *Dodge and Sons*

ATTORNEYS

United States Patent Office 3,140,082
Patented July 7, 1964

3,140,082
HYDRAULIC SYSTEM
Matthew W. Huber, Watertown, N.Y., assignor to The New York Air Brake Company, a corporation of New Jersey
Filed June 25, 1962, Ser. No. 204,959
18 Claims. (Cl. 267—2)

This invention relates to spring suspensions and particularly to spring suspensions suitable for use on track-laying vehicles.

The object of the invention is to provide an exclusive straightforward hydraulic spring suspension system affording constant deflection rate. According to the invention, the system includes a reservoir, a source of hydraulic fluid under pressure having a delivery conduit, and one or more spring units each of which comprises a fluid pressure motor having a pair of relatively movable elements that define a working chamber and are movable between first and second relative positions in which, respectively, the volume of the working chamber is a maximum and a minimum. Each working chamber is connected with the delivery conduit through a supply conduit containing a check valve arranged to prevent reverse flow from the working chamber to the source. One of the elements of each unit is formed with an outlet port that communicates with the working chamber when the elements are in the first relative position and which is closed by the other element of the unit during movement toward the second relative position. Each outlet port is connected with the reservoir through a return conduit containing a relief valve. The relief valve associated with each unit is urged in the opening direction by the pressure in the working chamber and is urged in the closing direction by the pressure in the supply conduit. Normally, the relief valve is closed and the hydraulic fluid under pressure in each spring unit supports the vehicle. However, when a shock load is imposed on a spring unit which increases working chamber pressure above supply pressure, the check valve closes, the relief valve opens, and one of the motor elements moves toward the second relative position. When the shock load has been dissipated below system pressure, the relief valve closes and the check valve opens to admit fluid to the working chamber and return the elements to the first relative or static position. Since the force required to deflect a spring unit is independent of the magnitude of the deflection, the system affords a constant deflection rate and is free of bounce. This factor contributes to pitch and roll control. Furthermore, in a multiple unit system, a large shock load imposed on one unit will result in a temporary depression of the pressure in the entire spring system during the period of recovery. This rapid equalization of pressure generates inherent pitch and roll stability.

The outlet port in the illustrated embodiment is so positioned along the path of travel of the motor elements that, when it is closed, a column of liquid is trapped in the working chamber. Therefore, in this embodiment, each spring unit is provided with a hydraulic cushion bump stop.

In the preferred embodiment of the invention, the source includes a variable delivery pump that is provided with a discharge pressure compensator, and the delivery conduit contains a metering orifice. The maximum pressure which is established by the discharge pressure compensator can be varied by the operator so that the spring rate of the system can be changed at will. The flow restriction afforded by the metering orifice also can be varied by the operator and, therefore, he may change the rate of recovery of the spring units. This feature also contributes to pitch and roll control. The preferred system also includes a lock-out valve located in the return conduit and which can be opened and closed by the operator. Closure of this valve produces a hydraulic lock in the system and prevents collapsing of the spring units when the pump is at rest.

The preferred system also includes a circuit for continuously circulating a limited quantity of hydraulic fluid through each spring unit for the purpose of cooling the fluid when the ambient temperature is high and for warming it when the ambient temperature is low. This circuit comprises a throttle valve located in each supply conduit upstream of the check valve and a second outlet port formed in the same element of each motor as the first outlet port and connected with the reservoir through a second return conduit containing a metering orifice. The throttle valve is moved in the closing and opening directions, respectively, as the flow rate through the second return conduit increases and decreases, with the result that a limited quantity of fluid is always circulated through each spring unit. The back pressure developed by the metering orifices is effective in the associated spring unit to support the vehicle.

Another feature of the preferred embodiment relates to means whereby the operator may adjust the static position of each spring unit. This means includes a plurality of spaced auxiliary outlet ports formed in the element of each motor containing the first and second outlet ports mentioned above and located between these other ports. These auxiliary ports are connected with the second return conduit upstream of the metering orifice and each of the connections between these outlet ports and the second return conduit contains a control valve. Corresponding valves on the various spring units may be opened and closed in unison by the operator. The spring unit assumes a static position in which it opens that outlet port farthest from the second relative position whose associated control valve is open and, therefore, selective operation of the control valves serves to vary the static position of the spring unit. When the suspension system is used on a vehicle, this scheme provides a convenient method of varying road clearance.

In summary, the preferred liquid spring suspension of this invention affords the following important advantages:
 (1) Constant deflection rate.
 (2) Inherent pitch and roll control.
 (3) Hydraulic cushion bump stop.
 (4) Operator controlled damping.
 (5) Operator controlled lockout.
 (6) Operator controlled adjustable spring rate.
 (7) Operator controlled adjustable ground clearance.
 (8) Constant controlled fluid flow through the spring system for cooling or warming as required.

The preferred embodiment of the invention is described herein with reference to the accompanying drawings in which.

Figure 1:
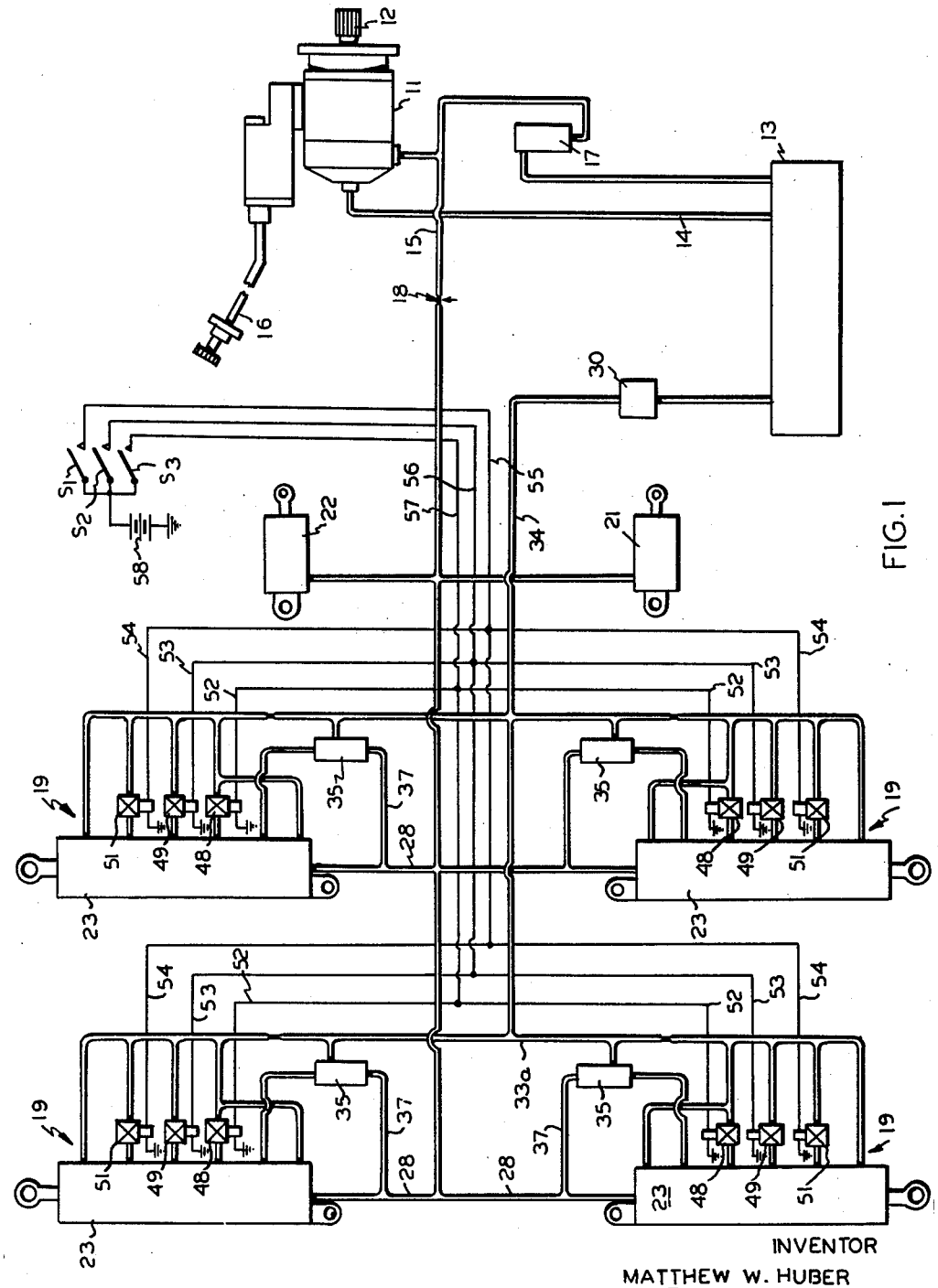
FIG. 1 is a schematic diagram of a hydraulic spring suspension system employing four spring units and intended for use on track-laying vehicles.

Referring to FIG. 1, the system comprises a variable displacement pump 11 having a drive shaft 12 which is connected with a suitable prime mover (not shown) and arranged to receive fluid from reservoir 13 through conduit 14 and to discharge fluid under pressure to delivery conduit 15. Pump 11 includes a discharge pressure compensator for varying displacement in inverse relation to discharge pressure to thereby maintain a maximum system pressure. This maximum pressure established by the compensator can be varied by the operator through remote control linkage 16. The delivery conduit 15 is provided with a system relief valve 17 and with an adjustable metering orifice 18 through which fluid is delivered to the four spring units 19. While four spring units 19 are shown in the drawing, it will be apparent that the number of units employed depends upon the requirements of the vehicle on which the system is used. A pair of single-acting piston motors 21 and 22 which receive fluid directly from conduit 15 serve as slack adjusters for the left-hand and right-hand tracks, respectively.

Figure 2:
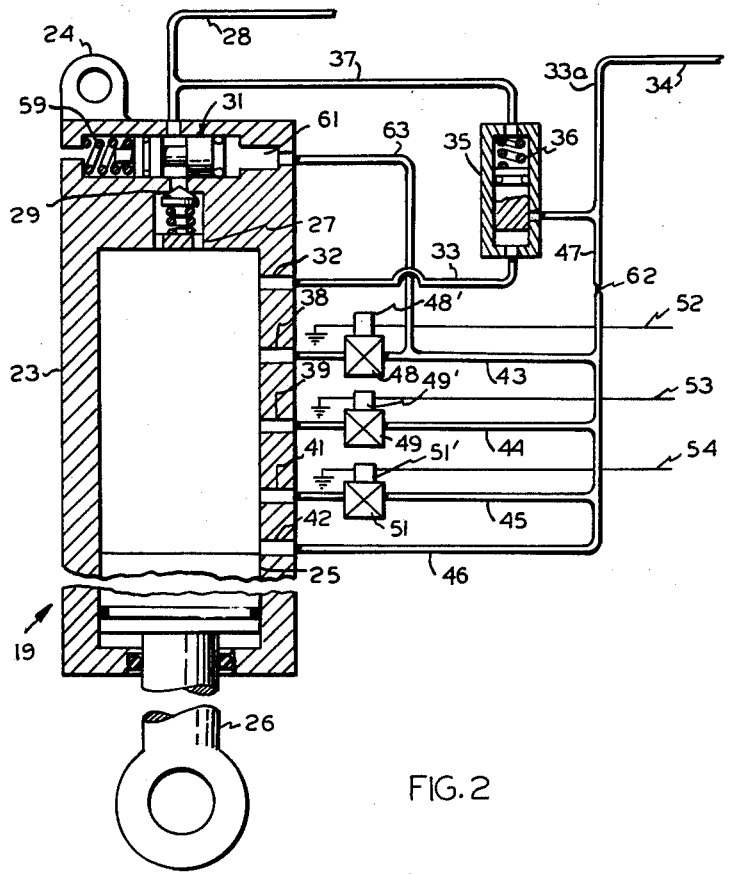
FIG. 2 is an enlarged view, partly in section, of one of the spring units and its associated components, it being understood that the parts are shown schematically.

As shown in FIG. 2, each spring unit 19 comprises a cylinder 23 formed with a lug 24 adapted for connection to the vehicle and containing a reciprocable piston 25 which carries a rod 26 adapted for connection to one of the track-supporting wheels. The closed end of the cylinder 23 contains an inlet port 27 that communicates with the delivery conduit 15 through a supply conduit 28 containing a check valve 29 and a throttle valve 31. Adjacent its closed end cylinder 23 is also provided with an outlet port 32 that is connected with reservoir 13 through conduits 33 and 33a and common return conduit 34. Common return conduit 34 contains a manually operated lock-out valve 30 which, as will appear below, may be closed to hydraulically lock the spring units and prevent collapse of the system when pump 11 is at rest. Flow through conduit 33 is controlled by a relief valve 35 that is urged in the opening direction by the pressure in cylinder 23 and in the closing direction by a light spring 36 and by the pressure in supply conduit 28 which is transmitted to it through conduit 37. The cylinder 23 also contains four other outlet ports 38, 39, 41 and 42 spaced longitudinally along its wall between outlet port 32 and the open end of the cylinder. These additional ports are connected with the common return conduit 34 through branch conduits 43, 44, 45 and 46, respectively, and through conduits 47 and 33a. The branch conduits 43–45 are opened and closed by control valves 48, 49 and 51, respectively, whose solenoid actuators 48', 49' and 51' are connected in parallel with the solenoid actuators of corresponding valves of the other spring units by branch conductors 52, 53 and 54 and common conductors 55, 56 and 57. The three solenoid circuits are selectively energized and de-energized by switches S1, S2 and S3 interposed between battery 58 and the common conductors.

The throttle valve 31 in the supply conduit 28 is biased in the closing direction by a coil spring 59 and is urged in the opening direction by the pressure in chamber 61 that acts on the right end face of its valve plunger. This chamber 61 is connected with conduit 47 at a point upstream of metering orifice 62 by conduit 63 and a portion of branch conduit 43, and, therefore, the pressure transmitted to it is a function of the rate of flow through conduit 47.

Operation

Let it be assumed that lock-out valve 30 is open and that switches S1, S2 and S3 are open to thereby de-energize the solenoids of the control valves 48, 49 and 51 and permit all of these valves to close. When pump 11 is put in operation, fluid is drawn from reservoir 13 and discharged to conduit 15 thereby raising the pressure in this conduit and in the supply conduits 28. This pressure is transmitted to the slack adjusters 21 and 22 thereby causing them to hold the tracks in a fully distended position, and, since the throttle valves 31 are open, system pressure is also transmitted to the cylinders 23 of spring units 19.

With the discharge pressure compensator of pump 11 adjusted to produce a maximum system pressure sufficient to raise the vehicle, the cylinder 23 of each spring unit moves upward to a static position in which the top edge of the piston 25 uncovers outlet port 42. Fluid may now flow from each cylinder to the reservoir 13 through conduits 46, 47, 33a, and 34. Because of the presence of metering orifices 62, a back pressure is created in each conduit 47 upstream of the orifice and this pressure, which is transmitted to chamber 61 by conduits 43 and 63, moves throttle valve 31 to the left to thereby restrict the flow of fluid into the cylinder 23. If the road thrust imposed on each of the pistons 25 remains constant, the fluid flow through each cylinder 23 and into the return conduit 34 is metered according to the size of orifice 62 and the weight of the vehicle and is independent of system pressure. Under these conditions, a limited quantity of fluid is circulated from the pump 11 to the reservoir 13 through each of the spring units 19 and in the case of low ambient temperature, this circulation keeps the system warm. When the ambient temperature is high, the entire system serves as a radiator and this circulation tends to cool the hydraulic fluid.

When the switches S1, S2 and S3 are open, the road clearance of the vehicle is a maximum since the spring units 19 are fully extended. In order to decrease the road clearance, the operator closes switch S1 to thereby energize solenoids 51' and open control valves 51. Opening of these control valves allows fluid to escape from cylinders 23 through outlet ports 41, and, as a result, the cylinders 23 move downward until the top edge of each piston 25 is level with outlet port 41. Closure of switches S2 and S3 establishes static positions of spring units 19 in which the top edges of pistons 25 are level with outlet ports 39 and 38, respectively. Variation of road clearance produced by the operation of the valves 48, 49 and 51 does not affect the operation of throttle valves 31 since the flow rate through each cylinder is not changed by varying the static position of the spring unit.

If the vehicle encounters an irregularity in the terrain over which it is traveling which is sufficient to create a surge pressure in one of the cylinders 23 that exceeds system pressure, the check valve 29 of that cylinder closes and the associated relief valve 35 opens. Piston 25 moves upwards displacing fluid from cylinder 23 through outlet port 32 and conduits 33, 33a, and 34 until the thrust force acting on the piston 25 is balanced by the force developed by the hydraulic pressure within the cylinder. When the pressure surge has been dissipated, relief valve 35 closes and check valve 29 opens so that fluid is again supplied to the cylinder 23 by pump 11 and piston 25 is moved back to the static position which it occupied when the surge occurred. During this period of spring action, the slack adjusters 21 and 22 automatically compensate for changes in track envelope.

The rate of spring recovery is controlled by adjusting the variable orifice 18. As the spring 19 requires filling after a deflection, the increased demand for fluid from the pressure compensated pump 11 is supplied practically instantaneously. The rate at which the increased flow occurs can be tailored by adjustable orifice 18 to produce the desired recovery rate. The larger the orifice, the faster the restoration to normal spring position and supporting pressure. Since this spring system is characterized by a constant deflection rate, it is free of bounce and affords inherently pitch and roll control.

If the thrust force exerted on a piston 25 by the terrain is sufficiently great to cause the piston to move to a position in which it overtravels and closes outlet port 32, then, since port 32 is spaced from the closed end of the cylinder, a column of liquid is trapped in the cylinder above the piston and the spring unit becomes hydraulically locked. This hydraulic cushion bump stop is a desirable feature because it prevents the piston from bottoming in the cylinder.

Under severe road shock conditions, the sudden demand on pump 11 to supply fluid to re-extend the piston 25 in the spring unit, or units, involved in absorbing the shock will cause a momentary dip in system pressure, which for that short period of time may be below the value of the hydraulic pressure in the remainder of the spring units. In this case, the relief valves 35 of those remaining units will open and hydraulic fluid will be discharged from the units to produce a sympathetic response to the road shock. This brief relaxation of forces in the spring units will also contribute to pitch and roll suppression.

Since the surge pressure at which relief valve 35 opens depends upon system pressure, the operator may vary the spring rate of the system by changing the pressure established by the discharge pressure compensator of pump 11. For minimum spring rate, system pressure is adjusted to a value only slightly higher than the pressure required to support the vehicle. A stiffer spring system results when the compensator is adjusted to maintain a higher system pressure.

The entire suspension system can be rendered inoperative simply by closing lock-out valve 30, since when this valve is closed, all of the return lines from the cylinders 23 to the reservoir 13 are closed. Under this condition, the check valve 29 of each spring unit closes and the pistons 25 are hydraulically locked. The inclusion of the lock-out valve 30 is a desirable feature because it prevents collapse of the spring system when the pump 11 is at rest.

While the spring units 19 in the illustrated embodiment are fluid pressure motors of the piston type, it will be apparent that other types of motors, such as rotary motors, can be used without sacrificing any of the essential features of the invention. It also will be apparent that means, such as hydraulic or pneumatic actuators, can be substituted for the electrical circuit employed to operate the control valves 48, 49 and 51 in this embodiment.

As stated previously, the drawing and description relate only to the preferred embodiment of the invention. Since many changes, some of which have been mentioned, can be made in the structure of this embodiment without departing from the inventive concept, the following claims should provide the sole measure of the scope of the invention.

What I claim is:
1. A liquid suspension system comprising
   (a) a source of hydraulic fluid under pressure;
   (b) a reservoir;
   (c) at least one suspension unit comprising a fluid pressure motor having a pair of relatively movable elements that define a working chamber, relative movement between the elements establishing first and second relative positions in which, respectively, the volume of the working chamber is a maximum and a minimum;
   (d) a supply conduit connecting the source with the working chamber;
   (e) a check valve in the supply conduit for preventing reverse flow from the working chamber to the source;
   (f) an outlet port formed in one of the elements and communicating with the working chamber when the elements are in the first relative position, the outlet port being so positioned that it is closed by the other element during relative movement toward the second relative position;
   (g) a return conduit connecting the outlet port with the reservoir;
   (h) a relief valve controlling flow through the return conduit and urged in the opening direction by the pressure at the outlet port; and
   (i) means responsive to the pressure in the supply conduit for urging the relief valve in the closing direction.

2. A liquid suspension system as defined in claim 1 including an adjustable metering orifice located in the supply conduit.

3. A liquid suspension system as defined in claim 1 including means for varying the supply pressure of the source.

4. A liquid suspension system as defined in claim 2 in which the source includes a variable delivery pump having a discharge pressure compensator; and including
   (a) a lock-out valve located in the return conduit and shiftable between open and closed positions; and
   (b) means for varying the maximum pressure established by the discharge pressure compensator.

5. A liquid suspension as defined in claim 1 in which the source includes a variable delivery pump having a discharge pressure compensator; and including
   (a) means for varying the pressure established by the discharge pressure compensator;
   (b) an adjustable metering orifice located in the supply conduit;
   (c) a lock-out valve located in the return conduit and shiftable between open and closed positions; and
   (d) in which the outlet port is so located that when this port is closed by said other element a column of liquid is trapped in the working chamber and serves as a hydraulic stop.

6. A liquid suspension system comprising
   (a) a source of hydraulic fluid under pressure;
   (b) at least one suspension unit comprising a fluid pressure motor having a pair of relatively movable elements that define a working chamber, relative movement between the elements establishing first and second relative positions in which, respectively, the volume of the working chamber is a maximum and a minimum;
   (c) a supply conduit connecting the source with the working chamber;
   (d) a throttle valve shiftable in opening and closing directions for controlling flow to the working chamber through the supply conduit;
   (e) first and second spaced outlet ports formed in one of the elements and communicating with the working chamber when the elements are in the first relative position, the ports being so positioned that the other element closes the first port and then the second port during relative movement toward the second relative position;
   (f) a reservoir;
   (g) a first return conduit connecting the first outlet port with the reservoir and containing a metering orifice;
   (h) means responsive to the rate of flow through the first outlet port for moving the throttle valve in the closing and opening directions, respectively, as the rate of flow increases and decreases below a predetermined value;
   (i) a check valve interposed in the supply conduit between the throttle valve and the working chamber and arranged to prevent reverse flow from the working chamber toward the throttle valve;
   (j) a second return conduit connecting the second outlet port with the reservoir;
   (k) a relief valve controlling flow through the second return conduit and shiftable in opening and closing directions;
   (l) means responsive to the pressure in the supply conduit upstream of the throttle valve for urging the relief valve in the closing direction; and
   (m) means responsive to the pressure in the second return conduit upstream of the relief valve for urging the relief valve in the opening direction.

7. A liquid suspension system as defined in claim 6 including an adjustable metering orifice located in the supply conduit between the source and the throttle valve.

8. A liquid suspension system as defined in claim 6 including a lock-out valve means for selectively opening and closing communication between the first and second return conduits and the reservoir.

9. A liquid suspension system as defined in claim 6
   (a) in which the source includes a variable delivery pump having a discharge pressure compensator; and (b) including means for varying the maximum discharge pressure established by the compensator.

10. A liquid suspension system as defined in claim 6 in which the second outlet port is so located that when this port is closed by the said other element liquid is trapped in the working chamber and serves as a hydraulic stop.

11. A liquid suspension system as defined in claim 6 including
  (a) a third outlet port formed in said one element and positioned between the first and second outlet ports;
  (b) a third return conduit connecting the third outlet port with the first return conduit upstream of the metering orifice; and
  (c) a control valve interposed in the third return conduit and shiftable between open and closed positions;
  (d) and wherein the flow rate responsive means responds to the flow rate through both the first and third outlet ports.

12. A liquid suspension system as defined in claim 6 including
  (a) a plurality of spaced intermediate outlet ports formed in said one element and located between the first and second outlet ports;
  (b) a plurality of auxiliary return conduits, one connecting each intermediate outlet port with the first return conduit upstream of the metering orifice; and
  (c) a control valve interposed in each auxiliary conduit and shiftable between open and closed positions;
  (d) and wherein the flow rate responsive means responds to the flow rate through the intermediate outlet ports and the first outlet port.

13. A liquid suspension system comprising
  (a) a source of hydraulic fluid under pressure having a delivery conduit;
  (b) a plurality of suspension units, each unit comprising a fluid pressure motor having a pair of relatively movable elements that define a working chamber, relative movement between the elements establishing first and second relative positions in which, respectively, the volume of the working chamber is a maximum and a minimum;
  (c) supply conduits, one connecting the delivery conduit with each working chamber;
  (d) throttle valves, one controlling flow through each supply conduit and each being shiftable in opening and closing directions;
  (e) check valves, one interposed in each supply conduit between the working chamber and the throttle valve for preventing reverse flow from the working chamber toward the throttle valve;
  (f) first and second spaced outlet ports formed in one of the elements of each suspension unit and communicating with the working chamber when the elements are in the first relative position, the ports being so positioned that the other element closes the first port and then the second port during relative movement toward the second relative position;
  (g) a reservoir;
  (h) first return conduits, one connecting each of the first outlet ports with the reservoir;
  (i) second return conduits, one connecting each of the second outlet ports with the reservoir;
  (j) relief valves, one located in and controlling flow through each of the second return conduits and each being urged in the opening direction by the pressure in the second return conduit;
  (k) means responsive to the pressure in each supply conduit for urging the associated relief valve in the closing direction;
  (l) metering orifices, one located in each of the first return conduits;
  (m) biasing means associated with each throttle valve and urging the valve in the opening direction; and
  (n) means connected with each throttle valve and responsive to the pressure in the associated first return conduit upstream of the metering orifice for shifting the throttle valve in the closing direction.

14. A liquid suspension system as defined in claim 13 including
  (a) a plurality of spaced intermediate outlet ports formed in each of said one of the elements and located between the first and second outlet ports;
  (b) auxiliary return conduits, one connecting each intermediate outlet port of each working chamber with the associated first return conduit at a point upstream of the metering orifice;
  (c) a control valve located in each auxiliary return conduit and shiftable between open and closed positions; and
  (d) an actuating means connected with each of the control valves associated with one suspension unit and with the corresponding control valve associated with each of the other suspension units, each actuating means serving selectively to open and close in unison corresponding control valves in all suspension units.

15. A liquid suspension system as defined in claim 14 in which the source includes a variable delivery pump having a discharge pressure compensator; and including
  (a) means for varying the discharge pressure established by the compensator; and
  (b) an adjustable flow restriction located in the delivery conduit.

16. A liquid suspension system as defined in claim 15 in which the first and second return conduits have a common portion; and including a lock-out valve located in the common portion and shiftable between open and closed positions.

17. A liquid suspension system as defined in claim 13 in which each second outlet port is so located that when this port is closed by the said other element a column of liquid is trapped in the working chamber and serves as a hydraulic stop.

18. A liquid suspension system as claimed in claim 6 in which the flow rate responsive means comprises
  (a) means biasing the throttle valve in the opening direction; and
  (b) means responsive to the pressure in the first return conduit upstream of the metering orifice for shifting the throttle valve in the closing direction.

References Cited in the file of this patent
UNITED STATES PATENTS

| | | |
|---|---|---|
| 1,861,821 | Schaum | June 7, 1932 |
| 2,861,794 | Beck | Nov. 25, 1958 |
| 2,962,280 | Heiss | Nov. 29, 1960 |

FOREIGN PATENTS

| | | |
|---|---|---|
| 1,178,690 | France | Dec. 15, 1958 |